United States Patent [19]

Liu

[11] Patent Number: 4,791,619
[45] Date of Patent: Dec. 13, 1988

[54] METHOD OF DETECTING AND CHARACTERIZING FEATURES IN A BOREHOLE

[75] Inventor: Olive Y. Liu, Houston, Tex.

[73] Assignee: Schlumberger Technology Corporation, Houston, Tex.

[21] Appl. No.: 150,473

[22] Filed: Jan. 26, 1988

Related U.S. Application Data

[63] Continuation of Ser. No. 910,558, Sep. 22, 1986.

[51] Int. Cl.$^4$ .............................................. G01V 1/40
[52] U.S. Cl. ...................................... 367/35; 367/33; 367/27; 181/105
[58] Field of Search .................... 367/25, 26, 27, 33, 367/35, 75; 181/105; 364/422

[56] References Cited

U.S. PATENT DOCUMENTS

| | | | |
|---|---|---|---|
| 4,314,339 | 2/1982 | Kenyon | 364/422 |
| 4,543,648 | 9/1985 | Hsu | 364/422 |
| 4,562,556 | 12/1985 | Ingram et al. | 367/27 |

OTHER PUBLICATIONS

"Semblance Processing of Borehole Acoustic Array Data," Kimball et al., Geophysics, vol. 49, #3, 3/84, pp. 274–281.
"Fracture Evaluation Using Borehole Sonic Velocity Measurements," Liu, O. Y., SPE paper #14399.

Primary Examiner—Thomas H. Tarcza
Assistant Examiner—Ian J. Lobo
Attorney, Agent, or Firm—Henry N. Garrana; John H. Bouchard

[57] ABSTRACT

Using waveforms or travel time acquired by multitransmitter and/or borehole sonic tools, acoustic velocity (or slowness) is computed for compressional, shear, and Stoneley waves using direct phase determination (DPD), the slowness time coherence (STC) method, and multiple shot processing (MSP). There is a nonzero difference between transmitter and receiver delta-t's (slownesses) when the sonic tool is in the vicinity of a borehole feature, such as a fracture or a borehole enlargement. The amount of the difference, T/R delta-t, for compressional, shear and Stoneley waves depends on the size and nature of the fracture(s). It is possible to determine the height, width, and dip angle of the fracture when the T/R delta-t's are used in conjunction with other model data. It is also possible to distinguish between borehole enlargements and fractures with the method of this invention.

8 Claims, 4 Drawing Sheets

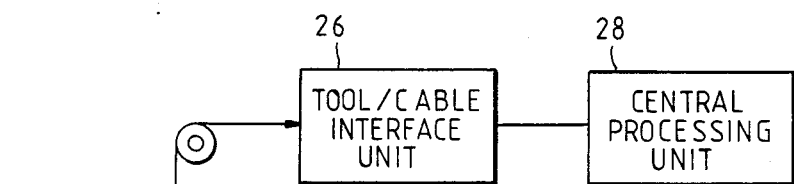
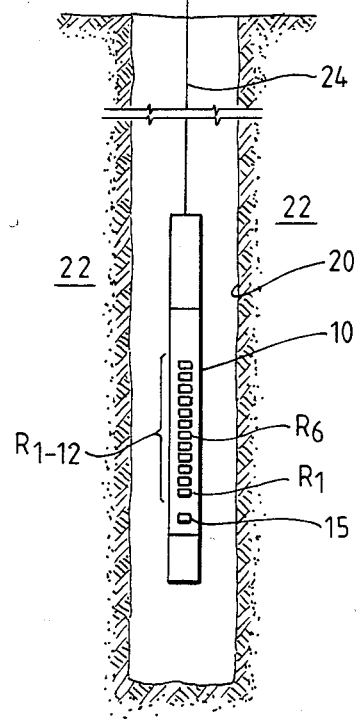
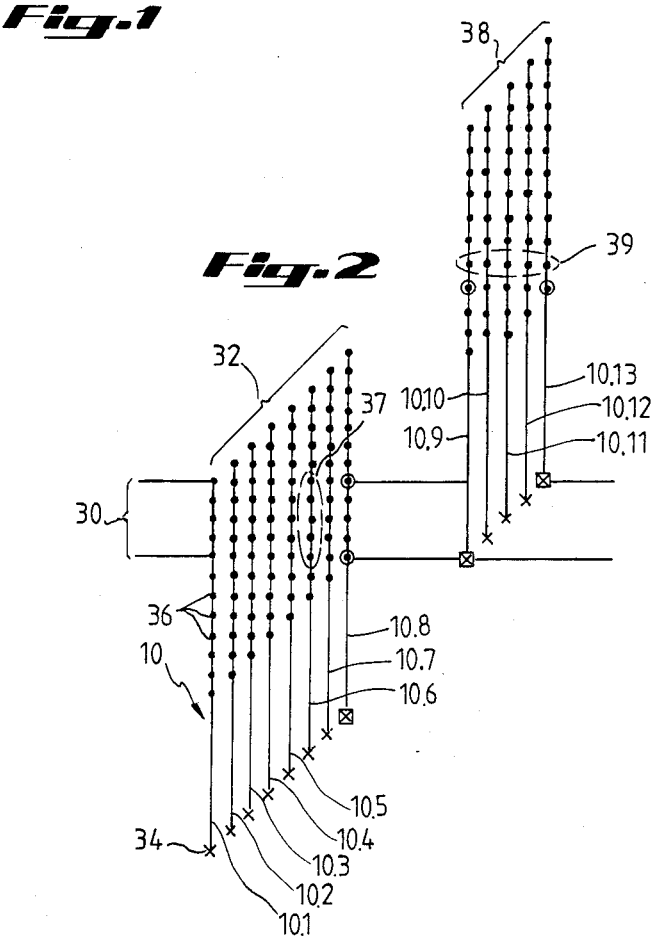
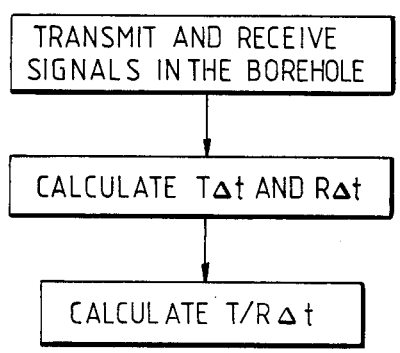

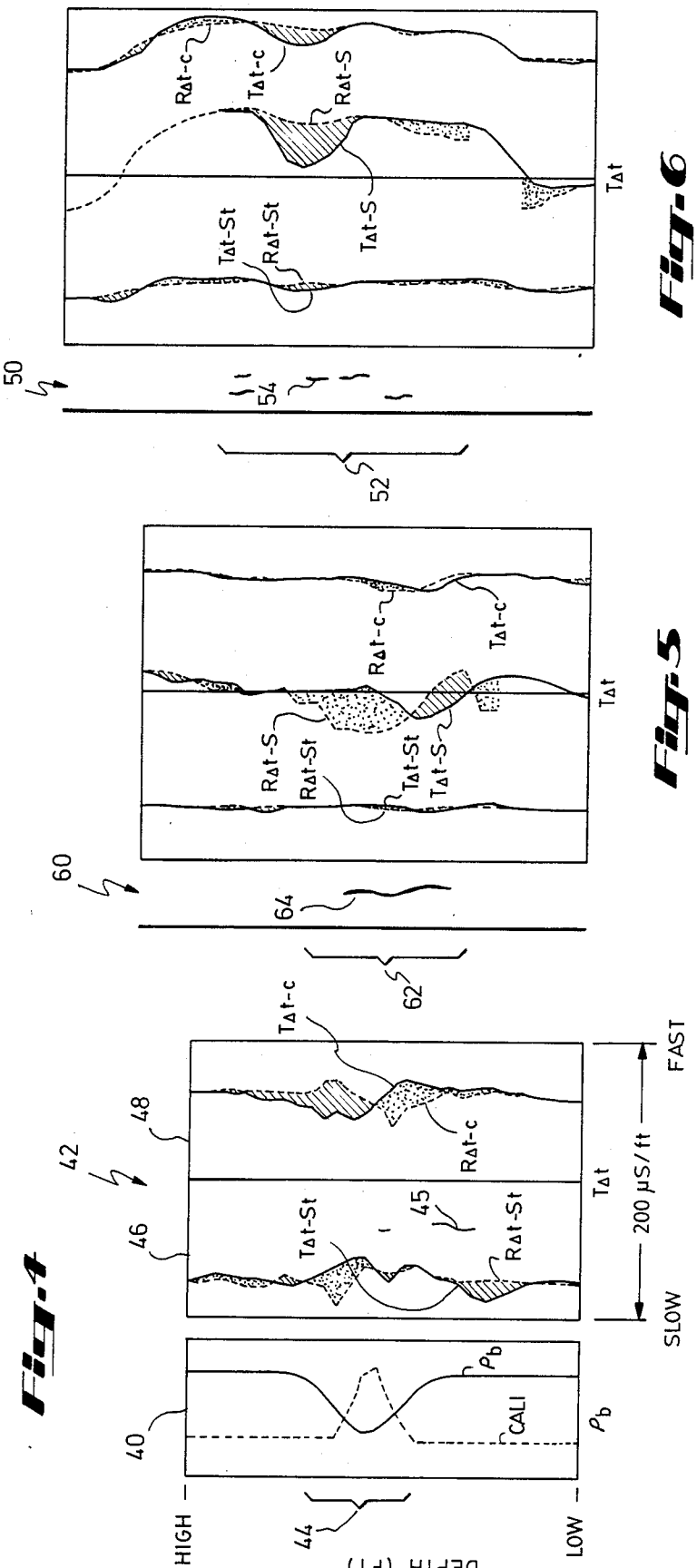

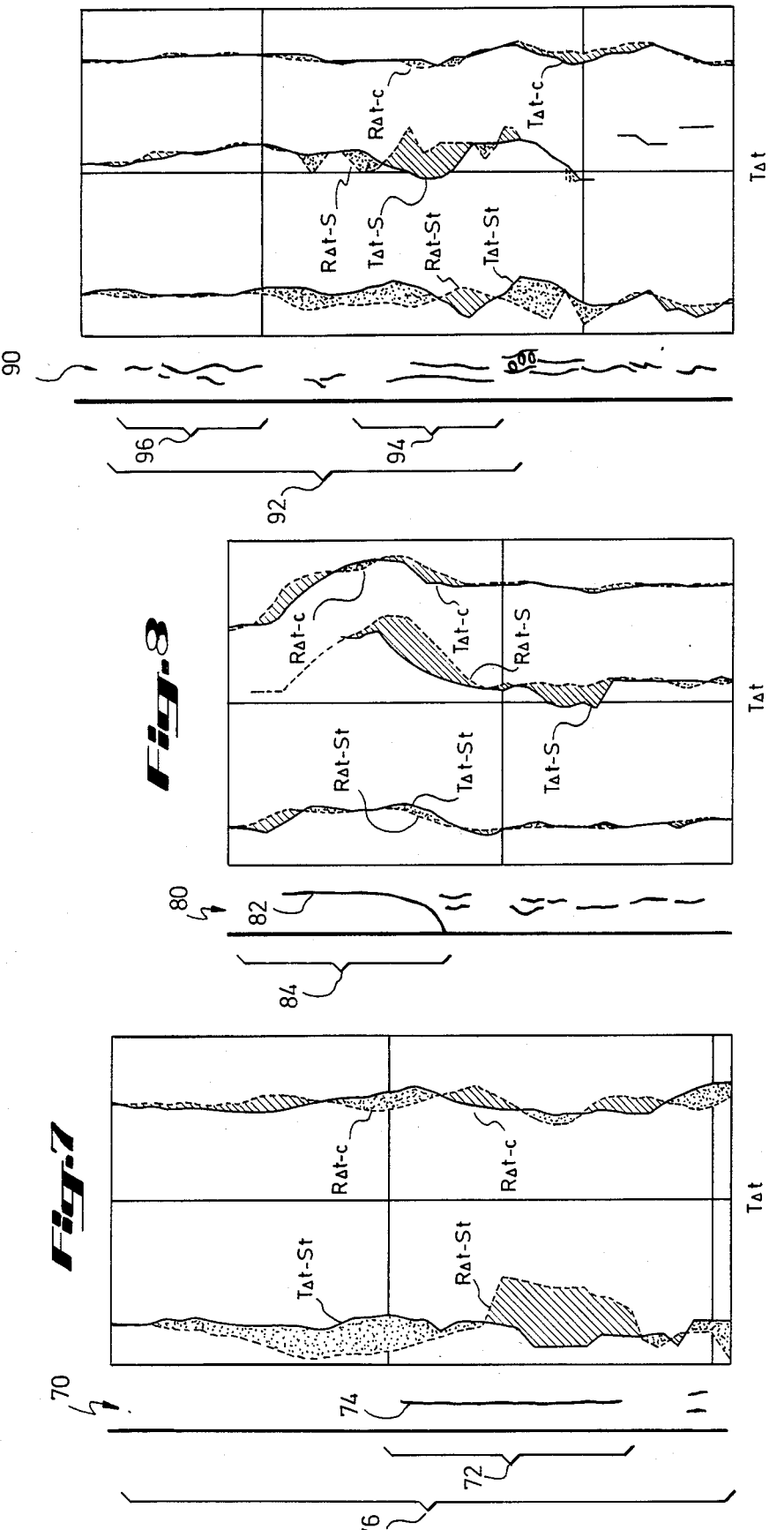

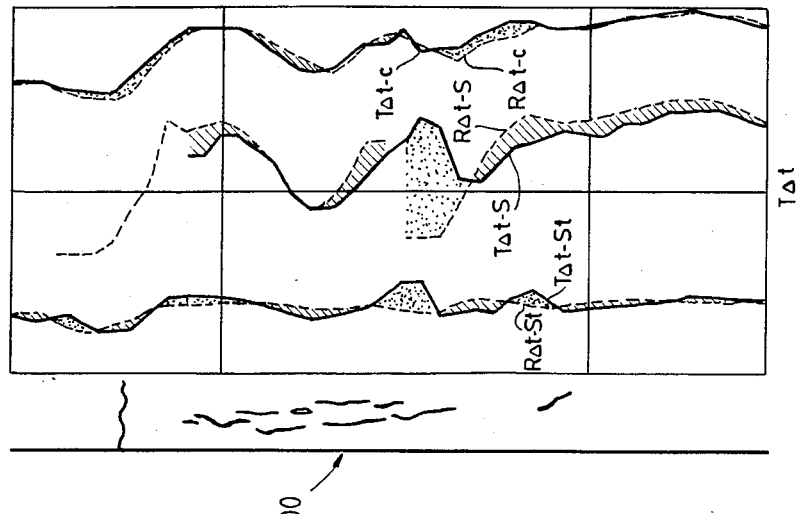
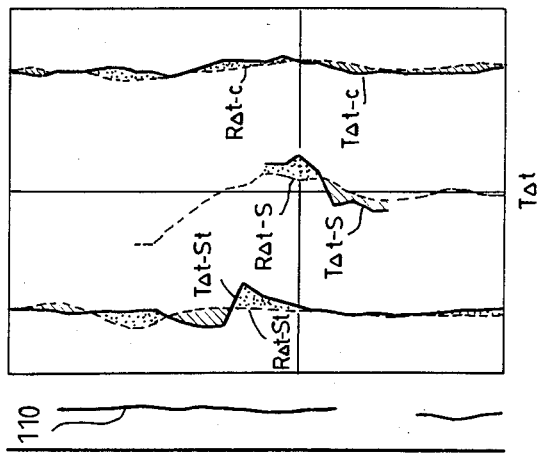
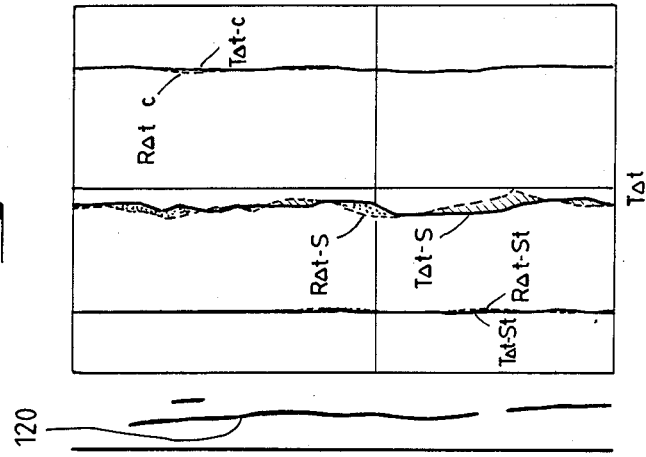

METHOD OF DETECTING AND CHARACTERIZING FEATURES IN A BOREHOLE

This is a continuation of application Ser. No. 910,558, filed Sept. 22, 1986.

TECHNICAL FIELD OF THE INVENTION

The invention relates to a method of processing signals obtained from a well logging device in a borehole and, more particularly, to signals obtained by multitransmitter and/or multireceiver borehole sonic tools, so as to detect and characterize features in and around the borehole, such as fractures.

BACKGROUND OF THE INVENTION

In the drilling of an oil or a gas well it is advantageous to obtain as much information as possible about the nature of the formations, or beds. To this end, core samples of the formation are obtained. Also, well logging devices are placed into the resulting borehole to measure various characteristic properties of the surrounding formation.

The generation and recording of borehole acoustic waves is a key measurement employed in oil well wireline logging. The traditional parameter to be estimated from the waveforms has been the travel time differences. Other techniques are also known, for instance, semblance processing of borehole acoustic array data, Kimball and Marzetta, Geophysics, Vol. 49, No. 3, March, 1984 at pages 274–281.

Acoustic waveforms, in addition to methods based on conventional logs, have been used to detect and characterize fractures intersecting and surrounding the borehole. These log-based methods include differential response to porosity measurements, magnitude of apparent power law exponent relating to formation porosity, and various resistivity log curves resulting from different responses to fracture conductivity. The acoustic methods, whether seismic, sonic, or ultrasonic, are usually based on the scattering and absorption of acoustic energy associated with the various wave components contained in the full waveforms as described in the SPE paper by the inventor noted, infra. For instance, recent borehole studies have suggested that the reduction in Stoneley or tube wave energy can be used as a reliable indicator of fractures open to fluid flow.

However, each method is subject to certain limitations in its own application. Various components in the waveform resulting from reflection, refraction and mode conversion are often, if not always difficult to separate. To make matters worse, these interference patterns can also be generated by bed boundaries and borehole irregularities, as well as by the fractures which are sought to be detected and characterized.

Thus, it is readily apparent that there has been an ongoing effor made in this art to derive meaningful information about formations from logging instruments. Improvements lie in the analysis of the signals, usually from conventional wireline logging equipment. The advent of the general purpose digital computer has been an indispensible tool to the engineer seeking to derive ever more meaningful interpretations of data. Incorporation by reference is made herein to U.S. Pat. Nos. 4,314,339, 4,543,648 (MSP) and 4,562,556, (DPD) which are representative of the way in which a compute may be applied to a wireline logging system to develop meaningful data from wireline data (signals).

SUMMARY OF THE INVENTION

According to the invention, sonic waves are transmitted and received by a logging tool in a borehole. Transmitter and receiver delta-t's (slownesses) are determined for the received waves. The difference therebetween is termed T/R delta-t, and is determined according to the position of the tool in the borehole.

According to an aspect of the invention, a nonzero T/R delta-t is indicative of a borehole feature, such as a borehole enlargement or a fracture.

According to another f.eature of the invention, fractures are characterized according to the T/R eelta-t's for shear, compressional and Stoneley waves.

According to another feature of the invention, borehole enlargements are distinguished from fractures by the relative slownesses of associated transmitter and receiver delta-t's. Such would generally be the case only where both enlargement and fracture are isolated.

Therefore, in summary, from one of its broad aspects, the invention contemplates a method of detecting features in a borehole, comprising: positioning a logging tool in the borehole; transmitting sonic waves in the borehole with the logging tool; receiving the sonic waves in the borehole with the logging tool; determining a receiver delta-t (slowness) for the sonic waves; determining a transmitter delta-t (slowness) for the sonic waves; comparing the transmitter delta-t and the receiver delta-t (slownesses) for the sonic waves; and determining a difference, T/R delta-t, between the slownesses of the transmitter delta-t and the receiver delta-t as a function of borehole position. Preferred details are hereinafter more particularly described.

Other objects, features and advantages of the invention will become apparent in light of the following description of the preferred embodiment.

DESCRIPTION OF THE DRAWINGS

FIG. 1 is a schematic representation of a borehole logging system according to the present invention.

FIG. 2 is a schematic representation of transmitter and receiver data reception points of 2 sonic tools according to the present invention.

FIG. 3 is a flowchart illustrating the inventive steps of the present invention.

FIG. 4 is a one-track log of data generated according to the prior art, shown side-by-side with a two-track log according to the present invention, for a borehole enlargement.

FIG. 5 is a schematic representation of borehole features, shown side-by-side with a two-track log according to the present invention, for a vertical, very thin, open fracture.

FIG. 6 is a schematic representation of borehole features, shown side-by-side with a two-track log according to the present invention, for vertical, partially-healed fractures.

FIG. 7 is a schematic representation of borehole features, shown side-by-side with a two-track log according to the present invention, for a vertical, large, open fracture.

FIG. 8 is a schematic representation of borehole features, shown side-by-side with a two-track log according to the present invention, for vertical, large, complex, partially-healed fractures.

FIG. 9 is a schematic representation of borehole features, shown side-by-side with a two-track log according to the present invention, for a heavily fractured zone with several distinct features.

FIG. 10 is a schematic representation of borehole features, shown side-by-side with a two-track log according to the present invention, for vertical, irregular fractures.

FIG. 11 is a schematic representation of borehole features, shown side-by-side with a two-track log according to the present invention, for a vertical, thin, open fracture.

FIG. 12 is a schematic representation of borehole features, shown side-by-side with a two-track log according to the present invention, for a long, very thin, 100% healed, straight vertical fracture.

FIG. 4 through 12 are exemplary of the surprising advantages of this invention. In the two-track logs shown therein, distinct slowness differences can be observed corresponding to the noted borehole feature. The vertical axis of each two-track log is in feet (towards the top is nearer to ground level), and the horizontal axis of each two-track log is in microsecond-per-foot spanning for the entire width of the two-track log, a slowness range of 200 microseconds-per-foot (towards the right is "slower"). These Figures, along with corresponding detailed explanations, core photographs, borehole televiewer logs, and notes on lithography can be found in an article prepared by the present inventor for presentation at the 60th Annual Technical Conference and Exhibition of the Society of Petroleum Engineers held in Las Vegas, Nev., Sept. 22-25, 1985 (SPE paper #14399) incorporated herein by reference.

DETAILED DESCRIPTION OF THE INVENTION

FIG. 1 shows a borehole logging system to which the present invention may be applied. A typical sonic tool 10 includes a transmitter 15 and twelve spaced-apart receivers R1-R12. The transmitter generates acoustic energy in the form of pulsed signals in a borehole 20 and in the surrounding formation 22. These signals are received by the receivers. Typically, the tool 10 is drawn up the borehole by a cable 24, under the direction of a tool/cable interface unit 26. As the tool 10 is continuously drawn up the cable, a transmitter is excited (fired), on command from surface control equipment (not shown). The receivers R1-R12 then receive signals at their instant location in spaced relationship to the transmitter 15. The tool 10 continues to be drawn up-hole to a next preselected depth, say six inches further up-hole, and the process is repeated. The received waveforms from each firing are provided to a central processing unit 28 for analysis of the received signals. However, if only the compressional delta-t's ($\Delta$ t's) will be measured, only the travel times from firing need to be recorded. The entire system, and/or portions thereof, may be either analog or digital, and is described in greater detail in the aforementioned U.S. Pat. No. 4,562,556.

FIG. 2 shows the configuration of the responses of a sonic tool employed in this invention. A suitable tool is a sonic array tool, one example being the eight receiver Array-Sonic tool produced by the instant assignee, however the remainder of the preferred embodiment will be shown with the FIG. 1 tool 10 having one transmitter 15 and twelve receivers R1-R12. FIGS. 4-12 illustrate responses analyzed from a tool having one transmitter and twelve receivers, but the principles discussed herein are equivalent.

Returning now to FIG. 2, a tool such as tool 10 shown in FIG. 2 would be represented in a series of up-hole displaced positions, 10.1 through 10.13, as it is drawn up a borehole (not shown) past a depth interval 30 being logged. Position 10.1 shows the tool 10 in a first position with its transmitter 15 in position at 34 and its receivers R1-R12 in positions as noted by the twelve spaced points 36. As the tool is drawn up the hole at a constant rate, a second firing/reception occurs at 10.2 with the tool 10 in a suitably displaced position. In a receiver section 32 of the logging procedure, as indicated by tool positions 10.1 through 10.8, the transmitter 15 at position 34 is below the depth interval being logged, and at each of these positions, five of the twelve receivers 36 span the depth interval being logged (Not subarray 37 at 10.6). In a transmitter section 38 of the logging procedure, as indicated by tool positions 10.9 through 10.13, the transmitter 15 is at five positions within the depth interval being logged, and one of the receivers is at a constant distance from the depth interval being logged (Note subarray 39). Such "array" techniques are generally known, and are shown, for instance in the aforementioned U.S. Pat. No. 4,543,648. General terms for such situations are to refer to the sub array arrangement 37 as a common transmitter array and the sub array 39 as common receiver array.

Techniques involving having a tool, at least two receivers, or a "non-array" technique, is also known, as exemplified in the aforementioned U.S. Pat. No. 4,562,556. A suitable non-array tool for practicing this invention is the Long Spaced Sonic tool, also produced by the instant assignee, having two transmitters and two receivers.

It should also be noted that the spacings between firings of the transmitter should be uniform for the group ranged between locations 10.1-10.8 and for the group ranged between 10.9-10.13 and that the spacings used for the second group should be some multiple of the spacings used for the first group. This is a functional requirement that simplifies computation and analysis.

With the aforementioned and other transmitter/receiver configurations, it is known to calculate interval travel time or slowness (delta-t, the reciprocal of acoustic velocity) for the sonic pulses. Typically, only a receiver delta-t (associated with the receiver section) or a transmitter delta-t (associated with the transmitter section) is calculated, not both. Furthermore, it is known to calculate either transmitter or receiver delta-t's for compressional, shear, and Stoneley waves according to known techniques such as Direct Phase Determination (DPD), Slowness Time Coherence (STC), and Multiple Shot Processing (MSP) techniques. For instance, DPD is discussed in detail in the aforementioned U.S. Pat. No. 4,562,556. The object of the several techniques applied heretofore to wireline data has essentially been to compensate for the various interferenoes, such as borehole enlargement, associated with the sonic waveforms encountered in borehole logging.

The interferences observed in sonic waveforms can be classified into three broad categories; (1) interferences resulting from waves reflected off a discontinuity in the formation or in the borehole wall, (2) interferences from mode conversion occurring when the incident wave (type A) is converted (to wave type B), and (3) interferences resulting from coupling between the fluid and the formation due to fractures. Because of the changing travel path of the wave as a tool, such as a borehole sonic tool, approaches or moves away from the interference surface, the first two interferences (Categories 1 and 2) exhibit patterns visible as a "W", "V", or "X" shape on variable density displays. Interference Categories 1 and 2 occur when the discontinuity is either a formation bed boundary, a borehole enlargement, or a fracture. Interference Category 3 (fracture coupling) occurs only at open fractures.

According to the invention, two principal methods were used in estimating the values of delta-t, for both receiver delta-t and transmitter delta-t. The direct phase determination (DPD) method was used for the non-array waveforms obtained from the Long-Spaced Sonic tool. In order to get a two foot depth resolution and the transmitter delta-t for the waveforms from a research experimental sonic array tool, the Multi Shot Processing (MSP) method was used. The heart of the MSP is a semblance processing called the Slowness Time Coherence (STC) method. The STC method detects arrivals in the windowed waveforms by computing the scalar semblance for a large number of possible arrival times and slownesses. The local maxima of the two-dimensional semblance function are identified by a peak-finding algorithm, such as is well known in the art. The corresponding slowness of compressional, shear, and Stoneley waves can then be determined. The STC processing makes few a priori assumptions about the contents of waveforms. The semblance processing techniques of the aforementioned Kimball and Marzetta article were also found to be useful in obtaining the individual receiver delta-t's for the method of this invention, and are hereby incorporated by reference. Transmitter delta-t's are also similarly dealt with in the art.

With the configuration shown in FIG. 2, two foot resolution is achieved by using waveforms from only five receivers. The semblance functions overlap the depth intervals being logged and the MSP method combines the semblance functions when overlapped, then determine the shear, Stoneley and compressional arrivals. In the labeling process of identifying compressional, shear, and Stoneley arrivals, strict time-to-slowness relationships based on transmitter/receiver spacing are imposed to screen out all peaks associated with the reflections and mode conversions resulting from fractures, bed boundaries, and borehole irregularities.

FIG. 3 is a flowchart illustrating the method of this invention. In a first step, sonic signals are transmitted and received in the borehole according to the techniques discussed hereinbefore. In a next step, both transmitter delta-t and receiver delta-t are calculated for the depth interval being logged according to th techniques discussed hereinbefore. In a next step, the difference between transmitter delta-t and receiver delta-t, for Stoneley, compressional and shear waves, respectively, is calculated (as a function of borehole depth), and may be displayed according to the examples given hereinafter showing two-track logs.

FIG. 4 shows a conventional log 40 of depth (feet on the vertical axis) versus caliper and density (on the horizontal axis) for a borehole interval. It is immediately apparent to one skilled in the art that the log 40 represents a borehole enlargement in a region (portion of the overall depth interval) 44, since both borehole caliper (dashed line) and density (solid line) vary abruptly thereat.

To the right side of the log 40 is a corresponding-in-depth two-track log 42 created according to the present invention. The two-track log 42 of FIG. 4, in similar form as the two-track logs of FIGS. 5–12, is divided into a left track 46 and a right track 48. In each of FIGS. 4–12, the left track is a plot of Stoneley transmitter delta-t (T Δt-St, solid line) and Stoneley receiver delta-t (R Δt-St, dashed line), and the right track is a plot of compressional transmitter delta-t (T Δt-C, solid line) and compressional receiver delta-t (R Δt-C, dashed line). Additionally, shear waves may be noted, as at 45, but may not always be present as noted explicitly in U.S. Pat. No. 4,575,830.

In FIG. 4 it is quite evident that there is a dramatic difference between compressional transmitter and receiver delta-t's in the region 44, which is an interval of approximately three feet. For the compressional T/R delta-t, the maximum difference is on the order of 30 microseconds-per-foot in the region 44. Furthermore, the compressional transmitter delta-t becomes faster as the logging tool approaches the borehole enlargement from below, and slower as it passes above it. There are other, apparently less correlated, differences between Stoneley transmitter and receiver delta-t's in the vicinity of the borehole enlargement. Of particular note however is not only the graphic indications of Stoneley and compressional transmitter and receiver delta-t differences, respectively, in the vicinity of the borehole enlargement, but also the striking equality of the respective Stoneley and compressional delta-t's at a moderate distance from the borehole enlargement. It is theorized that both the compressional and Stoneley T/R delta-t's below and above the borehole enlargement are due to other interferences.

The difference between transmitter delta-t and receiver delta-t, for either of the waves discussed herein, is abbreviated as "T/R delta-t", a term coined especially for the present discussion.

FIG. 5 shows a two-track log of transmitter and receiver delta-t's for Stoneley, shear, and compressional waves, respectively, along side of a representation 60 of a core sample displaying a very thin, vertical open fracture 62. Note the relative slownesses of the transmitter delta-t's with respect to their counterpart receiver delta-t's for each of the waves and the magnitude of the shear T/R delta-t in the vicinity of the fracture.

FIG. 6 shows a two-track log of transmitter and receiver delta-t's for Stoneley and compressional waves, respectively, adjacent a schematic representation 50 of a core sample at a corresponding depth. The core sample illustrates several irregular partially-healed fractures 54 in a depth interval 52 of about eight feet. Transmitter and receiver delta-t's for shear waves. T Δ t-S and R Δt-S respectively, are also shown in this log. Note the transmitter delta-t becomes slower as the logging tool approaches the fracture from below, and faster as it passes above it. This is in opposition to the example of FIG. 4. This is thought to be a significant phenomenon in characterizing a fracture, and will appear again in the following examples. The most notable T/R delta-t in this example is the shear T/R delta-t, which is on the order of a maximum of 25 microseconds-per-foot in the region of the fracture. The compressional T/R delta-t is on the order of a maximum of 10 microseconds-per-foot in this region.

FIG. 7 shows transmitter and receiver delta-t's for Stoneley and compressional waves, respectively, adjacent a representation of a core sample 70 displaying, in an interval 72, an open, large, vertical fracture 74 of variable width. The Stoneley T/R delta-t is enormous towards the middle of the fracture which is shown near the bottom of the left track, on the order of a maximum of 40 microseconds-per-foot, and isplays the characteristic pattern of transmitter delta-t and receiver delta-t having variable slowness and fastness in the vicinity of the fracture. It should be noted that the core sample taken in this case had a three and one-half inch diameter and was taken from an eight inch diameter borehole. This accounts for the Stoneley and compressional T/R delta-t's extending far beyond the representation of the fracture 74 over a depth interval 76, which is more characteristic of the actual fracture intersecting the borehole.

FIG. 8 shows a two-track log adjacent a borehole representation 80 showing a large, complex, vertical, partially-healed fracture 82 in a depth interval 84. Note that the fracture 82 seems to close midway along the depth interval, as indicated by the crossovers of transmitter and receiver delta-t's for all three waves thereat (T/R delta-t equals zero where the fracture 82 is closed). Non-zero T/R delta-t is noticeable below the region 84, where miscellaneous fractures are indicated.

FIG. 9 shows a heavily fractured zone 90 with several distinct features in a region 92. Noticeable non-zero Stoneley and shear T/R delta-t's are quite noticeable in a lower portion 94 of the region 92 where vertical fractures are evident. An upper portion 96 of the region 92 was noted to be 70-90% healed, and the T/R delta-t's are correspondingly small.

FIG. 10 displays several irregular vertical fractures, some open and some partially-healed. Of particular note is an extremely divergent shear T/R delta-t at a depth interval 100, where there was found to be a borehole enlargement.

FIG. 11 shows a thin, straight, open, vertical fracture 110 and can be contrasted with a similar fracture 120 in FIG. 12 which is 100% healed. Note that in FIG. 11 T/R delta-t is greater for all three waves.

From the examples shown, the following conclusions can be drawn:

A. Large open fractures produce extremely large changes and differences in compressional, shear, and Stoneley transmitter and receiver delta-t values. The extent of the fracture height can be estimated from these differences.

B. Large vertical and subvertical open fractures result in very large shear T/R delta-t's.

C. Filled fractures have very little or no effect on compressional or Stoneley T/R delta-t's, but produce noticeable differences in shear T/R delta-t.

D. Borehole enlargements and fractures both cause non-zero T/R delta-t's. However, T/R delta-t's caused by borehole enlargements appear to show a reverse pattern from those of fractures.

E. Bed boundaries have a very small effect on T/R delta-t's.

Changes in wave amplitude and attenuation may provide direct evidence for the existence of fractures, but changes in the apparent velocities (slownesses) provide important information on the type and size of the fractures. Precise height and dip angle of the fracture can be determined when these differences are used in conjunction other model data.

Further modifications will also occur to those skilled in the art, and such are considered to fall within the spirit and scope of the invention as defined in the appended claims.

I claim:

1. A method of detecting features in and surrounding a borehole comprising:
    positioning a logging tool in said borehole, said logging tool comprising means for transmitting and receiving sonic waves;
    transmitting sonic waves in said borehole with said transmitting means;
    receiving said sonic waves in said borehole with said receiving means;
    determining a receiver delta-t for said sonic waves;
    determining a transmitter delta-t for said sonic waves;
    comparing said transmitter delta-t and said receiver delta-t for said sonic waves; and
    determining the difference, T/R delta-t, between said transmitter delta-t and said receiver delta-t as a function of borehole position.

2. A method according to claim 1, further comprising:
    determining whether T/R delta-t is zero or non-zero; and
    if T/R delta-t is non-zero at a borehole position, determining that there is a discontinuity at said borehole position.

3. A method according to claim 2, wherein the maximum non-zero value of T/R delta-t is on the order of 10-25 microseconds-per-foot.

4. A method according to claim 2, wherein said sonic waves are received as Stoneley, shear, and/or compressional waves.

5. A method according to claim 4, wherein it is determined that said borehole feature is a large open fracture based on Stoneley, shear, and compressional T/R delta-t's.

6. A method according to claim 4, wherein it is determined that said borehole feature comprises large vertical and subvertical fractures based on shear T/R delta-t.

7. A method according to claim 4, wherein it is determined that said borehole feature is a healed fracture based on substantially zero Stoneley and compressional T/R delta-t's in conjunction with substantially non-zero shear T/R delta-t's 8. A method according to claim 4, wherein it is determined whether said discontinuity is a borehole enlargement or a fracture based on the relative difference between the transmitter and receiver delta-t's.

* * * * *